United States Patent
Peters et al.

[15] 3,652,219
[45] Mar. 28, 1972

[54] CHLORINATION OF IRON SULFIDES TO PRODUCE FERRIC CHLORIDE AND SUBSEQUENT OXIDATION TO PRODUCE IRON OXIDE AND CHLORINE

[72] Inventors: Ernest Peters; Roderick McElroy, both of Vancouver, British Columbia, Canada

[73] Assignee: Canadian Patents and Development Limited, Ottawa, Ontario, Canada

[22] Filed: Sept. 2, 1969

[21] Appl. No.: 854,444

[52] U.S. Cl. .................................. 23/200, 23/1 D, 23/87 R, 23/98, 23/205, 23/219, 23/224
[51] Int. Cl. ................. C01g 49/06, C01g 49/10, C01b 7/02
[58] Field of Search ...................... 23/200, 205, 87, 1 D, 219, 23/224

[56] References Cited

UNITED STATES PATENTS

| | | | |
|---|---|---|---|
| 845,868 | 3/1907 | Fronek | 23/1 D |
| 875,231 | 12/1907 | Acker | 23/205 R |
| 1,341,423 | 5/1920 | Gegenheimer et al. | 23/205 |
| 1,898,701 | 2/1933 | Wescott | 23/87 R |
| 1,917,229 | 7/1933 | Bacon et al. | 23/87 R X |
| 1,917,232 | 7/1933 | Bacon et al. | 23/200 R X |
| 1,917,787 | 7/1933 | Bacon et al. | 23/200 R X |
| 2,642,339 | 6/1953 | Sawyer | 23/200 R |
| 2,852,339 | 9/1958 | Hill | 23/200 R X |
| 2,895,796 | 7/1959 | Hill | 23/87 R |

*Primary Examiner*—Edward Stern
*Attorney*—Peter Kirby and Charles P. Curphey

[57] ABSTRACT

A process for decomposing iron sulfides in which finely ground iron sulfide is chlorinated with five to eight times the stoichiometrically required amount of liquid $S_2Cl_2$ containing dissolved elemental sulfur. After the chlorination, the solid material rich in ferric chloride is removed by decantation, filtration, etc., and the liquid consisting of excess $S_2Cl_2$ with elemental sulfur dissolved therein is cooled to crystallize out some of the elemental sulfur.

The ferric chloride is oxidized with oxygen to form iron oxide and chlorine. The iron oxide is recovered while the chlorine is used to regenerate the liquid $S_2Cl_2$ still containing some dissolved sulfur and the regenerated $S_2Cl_2$ is returned to the chlorination stage.

15 Claims, 2 Drawing Figures

CHLORINATION OF IRON SULFIDES TO PRODUCE FERRIC CHLORIDE AND SUBSEQUENT OXIDATION TO PRODUCE IRON OXIDE AND CHLORINE

BACKGROUND OF THE INVENTION

1. Field of the Invention

This invention relates to the decomposition of iron sulfides by means of sulfur chloride.

2. Description of the Prior Art

It has long been known to react iron sulfides with chlorine and proposals have been made to utilize these reactions as a means for decomposing iron sulfides to produce sulfur and iron chlorides. An essential feature of such a process is the removal of sulfur formed in the reaction and most prior art processes have involved operations at temperatures above the distillation range of sulfur or at lower temperatures which would still permit volatilization of the sulfur substantially as quickly as is formed. The above processes have not been successful and two of the most important reasons for this have been difficulties in providing apparatus capable of withstanding the effects of chlorine and its by-products under the operating conditions and also that the ferrous chloride formed interferred with the complete reaction of the iron sulfide with the chlorine.

More recent attempts to overcome the prior art difficulties are described in Hill U.S. Pat. No. 2,895,796, issued July 21, 1959. According to the Hill process, pyrite was treated with sulfur and chlorine at a temperature between the melting and boiling points of sulfur and the reaction products were removed from the liquid medium. This process has a number of disadvantages which have prevented it from being commercialized. Firstly, liquid sulfur was used as solvent thus necessitating high temperatures and chlorine was eventually eliminated from the solvent. As a result, external heating was necessary and the process also prevented the possible use of metals such as monel as construction materials because the sulfidization of these metals is reliably inhibited by chlorine while being aggravated by higher temperatures.

Secondly, liquid sulfur at the operating temperatures used by Hill is a viscous liquid about the consistency of heavy oil or corn syrup. The separation of ferrous chloride from such a viscous liquid obviously presents extremely difficult engineering problems.

It is, therefore, an object of the present invention to provide an improved process for decomposing iron sulfide which will be commercially useful.

SUMMARY OF THE INVENTION

According to the new process of the present invention, we react a finely ground iron sulfide with a stoichiometric excess of sulfur chloride, thereby converting the iron sulfide into iron chloride and elemental sulfur dissolved in the excess liquid sulfur chloride. With this process the liquid sulfur chloride is utilized both as a chlorinating agent and as a solvent for sulfur.

After the entire body of iron sulfide is completely chlorinated, the solid materials obtained containing ferric chloride are separated from the liquid consisting of the excess sulfur chloride containing elemental sulfur dissolved therein. A portion of the elemental sulfur is crystallized out of the sulfur chloride liquid and the ferric chloride is oxidized to form iron oxide and chlorine. This chlorine can be used to regenerate the excess sulfur chloride containing some dissolved elemental sulfur and the regenerated sulfur chloride can then be returned to the chlorination stage.

DESCRIPTION OF PREFERRED EMBODIMENTS

ORES

The iron sulfide ore being chlorinated according to this invention is preferably pyrite ($FeS_2$) and/or pyrrhotite ($Fe_{1-x}S$; $0 < x < 0.20$). It may contain a number of impurity minerals such as arsenopyrite (FeAsS), silica ($SiO_2$), argentite ($Ag_2S$), chalcocite ($Cu_2S$), covellite (CuS), bornite ($Cu_5FeS_4$) chalcopyrite ($CuFeS_2$), sphalerite (ZnS), galena (PbS), pentlandite ((Ni,Fe)S), molybdenite ($MoS_2$), magnetite etc. It may also contain in undefined minerals such rare constituents as gold, platinum metals, bismuth, cadmium, indium, antimony, selenium, tellurium, etc.

CHLORINATION

The solvent and chlorinating agent is essentially a sulfur chloride ($S_2Cl_2$). Since this material is recycled as obtained in the regeneration, it may contain in solution excess chlorine ($SCl_2$) or excess sulfur, relative to the formula $S_2Cl_2$. According to a particularly preferred feature of the invention, $S_2Cl_2$ saturated with elemental sulfur at room temperature is used as the starting solvent and chlorinating agent.

The principal reaction taking place during chlorination is expressed by the following equation:

$$3S_2Cl_2 + 2FeS_2 \rightarrow Fe_2Cl_6 + 10S° \qquad (1)$$

This reaction takes place with the evolution of heat in the presence of excess sulfur chloride. Thus, no external heat is required for the process and the reaction temperature will generally range from room temperature up to the boiling point of the solvent (135° C.). The reaction rate increase with temperature, as does the solubility of elemental sulfur in the sulfur chloride.

The pulp density during chlorination is selected to utilize the exothermic reaction heat to reach and maintain the operating temperature. A wide range of pulp densities is possible depending on such factors as the nature of the ore, heat balance, etc. Thus, up to 20 moles or more of $S_2Cl_2$ per mole of iron sulfides can be used but preferably about 5 to 8 moles of $S_2Cl_2$ are used per mole of iron sulfides. This molar excess is preferably controlled to yield just enough exothermic reaction heat to raise all reactants from room temperature to a preferred reaction temperature of about 135° to 150° C.

In general, the chlorination and sulfur extraction rate increases with fineness of grind of the ore. The different minerals chlorinate at different rates and for pyrite it has been found to be particularly desirable to use −200 mesh material. A very rapid decomposition of this ore is obtained at or near the boiling point of the solvent containing moderate amounts of dissolved sulfur. The temperatures may go as high as 150° for rather high sulfur values and the reaction times under these conditions will normally be from 1½ to 2 hours or less.

Our experiments have shown that a screened sample of pyrite in the size range −200 +325 mesh chlorinated 89.5 percent in 1 hour and 97.5 percent in 1½ hours. A sample ground to 95 percent − 325 mesh was 100 percent reacted in 25 minutes. Material coarser than 200 mesh, while being 60 percent reactive in 1 hour required up to 5 hours for complete reaction.

In separate experiments with bornite, covellite, galena, sphalerite and molybdenite, it was determined that only sphalerite and molybdenite reacted more slowly than pyrite. Even coarsely ground samples (plus 150 mesh) of galena, covellite and bornite were reacted completely in 1 hour.

The ferric chloride which is produced during chlorination has a very slight solubility in sulfur chloride at the reaction temperature. Up to 20 percent of the iron may appear as ferrous chloride, which is also insoluble. It has also been observed that $ZnCl_2$, $PbCl_2$, $CuCl_2$, and AgCl as well as an undetermined form of gold are essentially insoluble in sulfur chloride containing dissolved sulfur.

Because of the low chlorinating temperatures which we are able to use with our process, a variety of materials can be used for the construction of the chlorinator. The usual Pyrex glass lining which is normally used for very harsh conditions can be used, but a material such as monel metal is also satisfactory. These nickel based alloys are passive in chlorine and are resistant to sulfidization when chlorine or sulfur chloride is present. Austenitic stainless steels of the 18-8 type are also satisfactory for this purpose.

LIQUID SOLID SEPARATION AFTER CHLORINATION

A very important feature of this invention is the ease with which the solid materials can be separated from the liquid after the chlorination. Because the elemental sulfur remains completely dissolved in the the sulfur chloride solvent, the liquid viscosity remains low and the solid liquid separation can be conveniently carried out by simple decantation or filtration. Since the ferric chloride rich residue obtained after filtration may contain up to about 40 percent liquid phase by weight when in the wet condition, it has been found to be desirable to include one or more washing and/or distillation steps with the filtration.

This separation may also be done by utilizing hot chlorine gas from the oxidation unit. Thus, a hot gas stream from the oxidation unit containing chlorine and ferric chloride is contacted with the reaction product from the chlorinator, vaporizing the ferric chloride and sulfur chloride in the reaction product while completely chlorinating any residual sulfides and entrained sulfur. Other chlorides (Cu, Pb, Zn, etc.) and (oxide) gangue remain as solids and may be separated at this stage. The gas stream is then cooled to successively condense pure solid ferric chloride for oxidation and sulfur chloride for recycle.

SULFUR CRYSTALLIZATION

Elemental sulfur will crystallize out of the sulfur chloride solution containing dissolved sulfur coming from the chlorinator when the solution is cooled below the saturation temperature. For example, a solution containing 40 mole percent elemental sulfur ($S_8$) will begin crystallizing at about 65° C. It has also been found that the crystallization will come down to the final level slowly at about 35° C.

It is necessary to crystallize only as much sulfur out of the sulfur chloride solution as originates from the ore. It will be seen that this accounts for only 40 percent of the sulfur produced by the stoichiometry of Equation 1. Thus, either only a fraction of the sulfur chloride solution must be treated in the crystallizer or alternatively, crystallization need only be extended through a small temperature range after it begins. For example, a sulfur chloride solution containing 20 mole percent elemental sulfur ($S_8$) entering the chlorinator and reacting with pyrite at the molar ratio of 6:1 will yield a solution of sulfur chloride of 32 mole percent elemental sulfur. Crystallization of rhombic sulfur can begin from this solution at about 58° C. with the pyritic sulfur crystallized out completely at about 55° C. and the original sulfur chloride composition of 20 mole percent sulfur will be reached at about 41° C.

We have studied the nature of the crystallized sulfur and have found it be of rhombic form and relatively pure with sulfur chloride and ferric chloride as trace impurities. The crystal size can be controlled by cooling rates and by mixing during crystallization. The crystals formed according to this invention are completely resistant to weathering and dusting because they are formed in the stable rhombic crystal configuration. By contrast, sulfur cooled from a melt will often weather and dust because of recrystallization after solidification.

The crystallizer is made from similar materials as that used for the chlorinator.

OXIDATION

It has been found to be desirable to use oxygen rather than air because, firstly, this permits enough heat to be generated to almost reach reaction temperature from ambient temperature with no more than slight preheating of the oxygen. Secondly, there is a negligible volume of gas not capable of absorption and recycle when oxygen is used in slight deficiency.

With pure oxygen the temperature can be exothermally raised to more than 500° C. and when the pure oxygen is preheated the oxidizer temperature can be exothermally raised to the 900°–1,000° C. range. If the ferric chloride contains nonferrous metal chloride values, some of these, namely zinc, lead, silver, gold, copper and molybdenum may be volatilized in the oxidizer, leaving a high grade iron oxide residue. The chlorides of these metals are not oxidizable in the presence of chlorine and the nickel and cobalt chlorides are also not oxidizable in these conditions, but cannot be volatilized at 1,000° C.

Any sulfur or unchlorinated sulfides present react in the oxidizer to yield $SO_2$ which accompanies the effluent chlorine gas.

PURIFICATION AND ABSORPTION OF CHLORINE GAS

The chlorine gas coming from the oxidizer can be at temperatures of up to 1,000° C. and may contain gaseous metal chlorides. These metal chlorides will condense as fumes on cooling. Most nonferrous metals condense at 800° C. while $ZnCl_2$ may not condense above 500°–600° C. and excess $Fe_2Cl_6$ above 300° C.

Control of the temperature in this range can be obtained with sulfur chloride sprays. Excess sulfur will react with gaseous chlorine, but this reaction generates negligible heat, compared with that absorbed by volatilization of $S_2Cl_2$.

The fumes can be collected very easily between cooling steps by the use of cyclones.

The final absorption of chlorine in sulfur chloride is preferably conducted with water cooling to avoid vapor losses. A small volume of gas should also be purged, containing residual nitrogen, sulfur dioxide and perhaps hydrogen chloride. It is important to minimize these for an optimum operation.

DESCRIPTION OF DRAWINGS

In the attached drawings which illustrate certain preferred embodiments of the invention:

As shown in FIG. 1, an iron sulfide ore or concentrate is fed into chlorinator 10 along with a recycle stream 11 of sulfur chloride. After the chlorination is completed, the reaction products 12 pass to decantation vessel 13 where a liquid stream 14 consisting essentially of sulfur chloride containing dissolved sulfur is passed to clarifying filtration unit 15 while the remaining solid material 16 goes to filtration unit 17 where additional liquid is removed and returned to the chlorinator 10 by line 18. The solid material 19 from filtration unit 17 passes to a distillation unit 20 together with solid material 21 from clarifying filtration unit 15. This distillation unit removes still more liquid which passes through line 22 and joins with recycle line 18.

Figure 1:
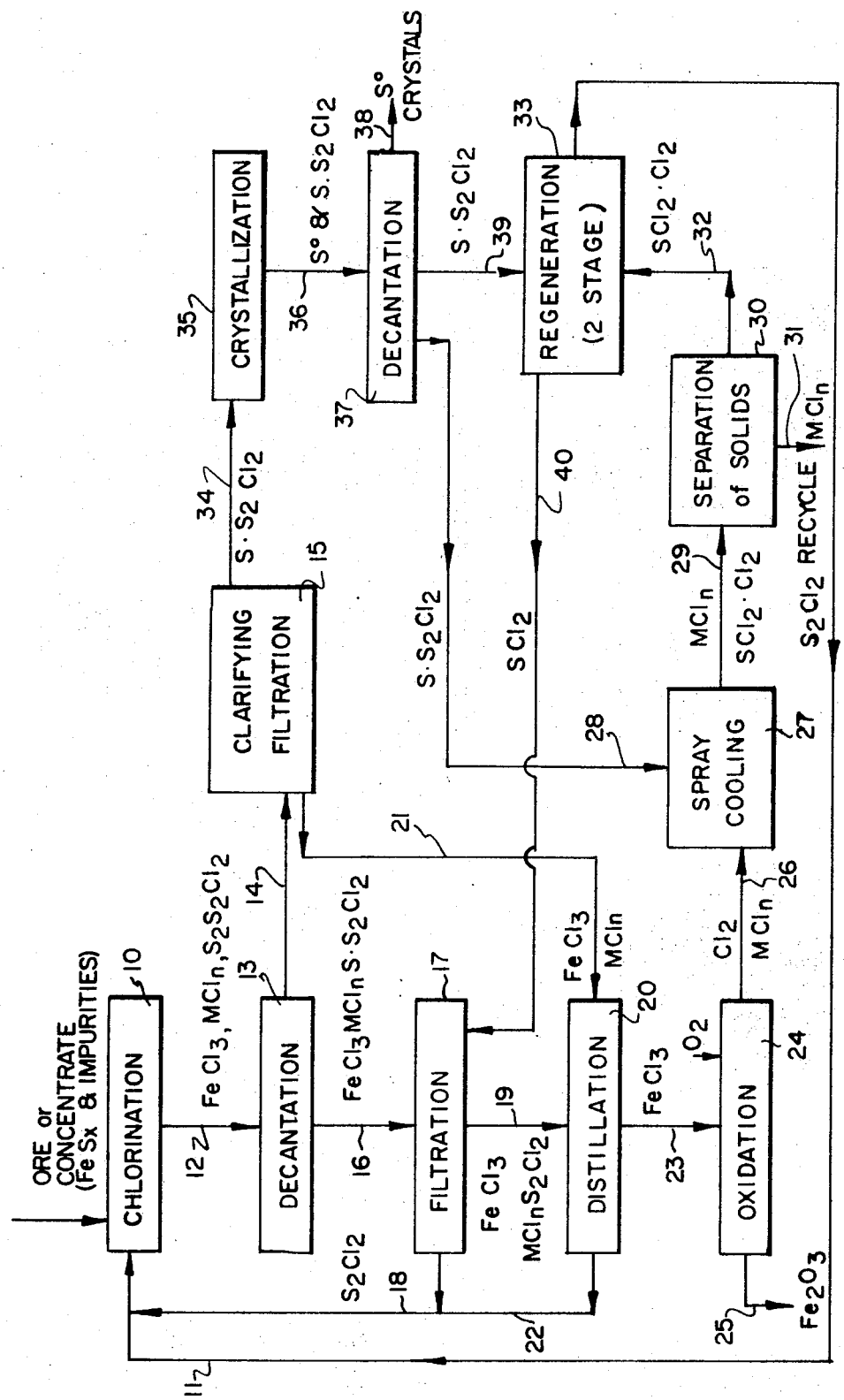
FIG. 1 is a diagrammatic flow sheet showing one process sequence.

The solid product 23 from distillation unit 20 is substantially free of the liquid and passes to oxidation unit 24 where it is contacted with oxygen. In the oxidation unit the $FeCl_3$ in the solid material is converted to $Fe_2O_3$ which is removed at 25 and the gaseous stream 26 consisting of chlorine and metal chlorides passes to spray cooling unit 27 where it is contacted with a stream 28 of sulfur chloride containing dissolved sulfur. A stream of cooled mixture 29 from the spray cooling unit passes to a separation stage 30 where the metal chlorides 31 are removed and the sulfur chloride and chlorine 32 pass to a two-stage regeneration unit 33.

Returning now to the clarifying filtration unit 15, a stream of sulfur chloride containing dissolved sulfur 34 is obtained from this unit and passes to the crystallization unit 35. In the crystallization unit the temperature lowers and rhombic sulfur crystallizes out. This product 36 then passes to the decantation unit 37 where the rhombic sulfur crystals 38 are removed and the stream 39 containing sulfur chloride and still some dissolved sulfur passes to regeneration unit 33.

In the regeneration unit the chlorine is contacted with the sulfur chloride containing dissolved sulfur producing a recycle stream 11 of sulfur chloride which is recycled back to chlorinator 10.

Figure 2:
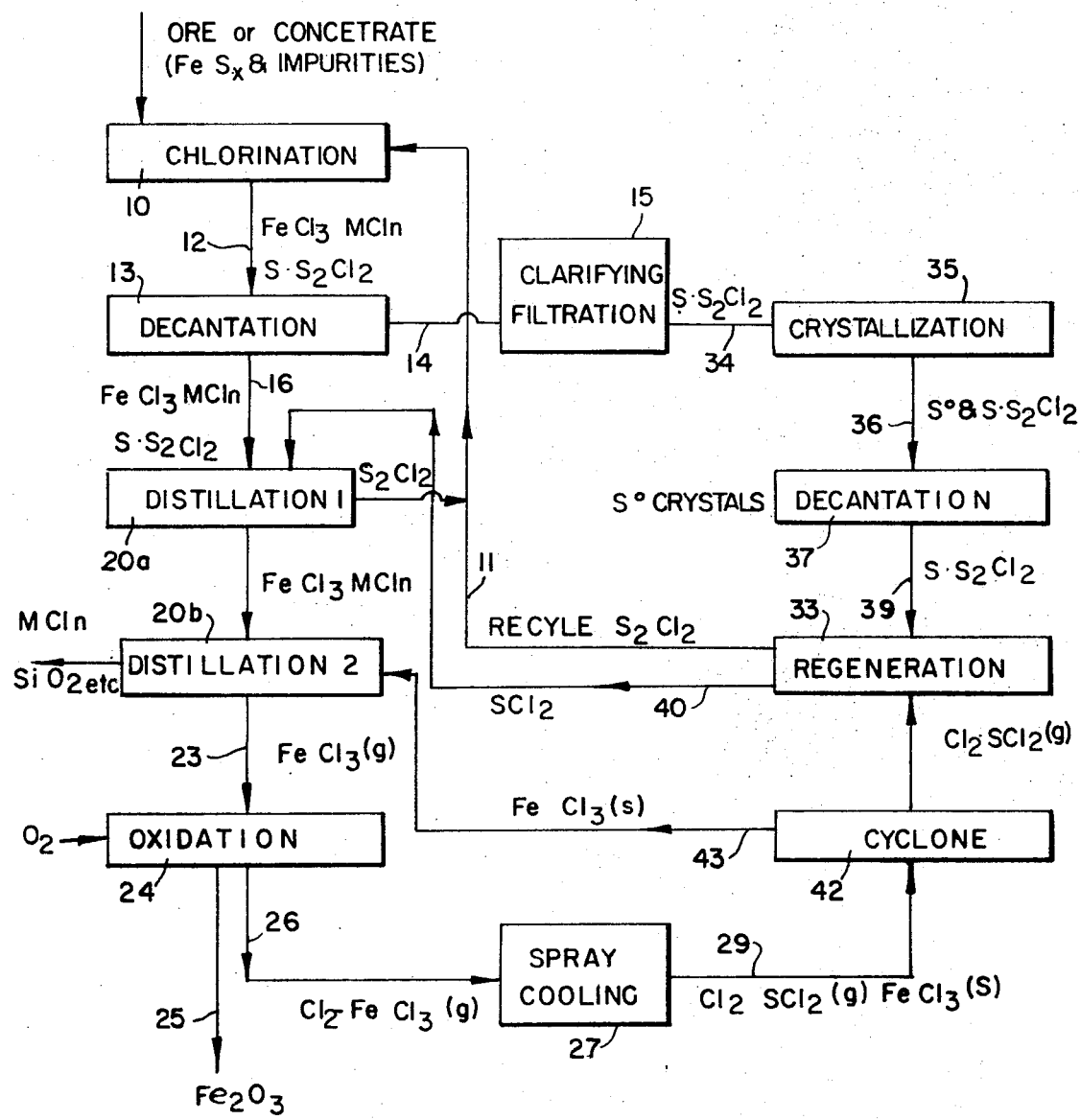
FIG. 2 is another diagrammatic flow sheet showing a second process sequence.

FIG. 2 shows an alternative process sequence in which an iron sulfide or ore concentrate is fed to chlorinator 10 along with a recycle stream 11 of sulfur chloride. After the chlorination is completed the reaction products 12 consisting of metal chlorides and sulfur chloride with dissolved sulfur are passed to decantation unit 13 where stream 14 of sulfur chloride containing dissolved sulfur is removed and passed to clarifying filtration unit 15 while the solid product 16 consisting of the metal chlorides with some liquid still present is passed to distillation unit 20a where the liquid consisting essentially of sulfur chloride with dissolved sulfur is passed to the recycle line 11 and the solid material consisting of the metal chlorides is passed to the second distillation unit 20b. In the second distillation unit further purification of the metal chlorides takes place with volatilizable materials being removed leaving a substantially pure stream of ferric chloride 23 which passes to oxidation unit 24. Here the ferric chloride is contacted with oxygen producing an $Fe_2O_3$ product 25 and a stream 26 of chlorine with some ferric chloride. This passes to spray cooling unit 27 and the cool stream 29 obtained therefrom is passed through cyclone 42 to get rid of $FeCl_3$ dust. This $FeCl_3$ dust 43 is returned to distillation unit 20b while a stream 32 of chlorine and sulfur chloride passes to regeneration unit 33. From the clarifying filtration unit 15 there is obtained a stream 34 of sulfur chloride containing dissolved sulfur and this passes to crystallization unit 35 where cooling and formation of rhombic sulfur takes place. The product from the crystallization 36 passes to decantation vessel 37 where the rhombic sulfur crystals 38 are removed and the stream 39 of sulfur chloride containing some dissolved sulfur passes to regeneration unit 33. The products of the regeneration unit are the recycle stream 11 of sulfur chloride which is returned to chlorinator 10 and a stream 40 of sulfur dichloride which passes to distillation unit 20a.

The invention is further illustrated by the following non-limitative examples:

EXAMPLE 1

368.5 grams $S_2Cl_2$ were saturated at room temperature with 99.5 grams elemental sulfur. Fifty grams of −200 mesh Noranda pyrite containing 5% $Fe_3O_4$ were slowly added to the hot $S_2Cl_2$ saturated with sulfur. After holding at a maximum temperature of about 145° C. for 15 minutes, the mixture was cooled to 100° C. and the liquid decanted.

Sulfur was crystallized from the liquid in stoichiometric quantity and the composition of the sludge was as follows:

| | |
|---|---|
| $FeCl_3$ | 58 g. |
| $FeS_2$ | 4.7 g. |
| $Fe_3O_4$ | 2.5 g. |
| $S_2Cl_2$ | 63 g. |
| S° | 15 g. |

These results show that 90 percent of the $FeS_2$ was reacted.

EXAMPLE 2

An agitated chlorinating vessel containing 840 tons of solution consisting of 740 tons of $S_2Cl_2$ and 100 tons of dissolved elemental sulfur is initially heated to 100° C., then charged with 100 tons of −200 mesh pyrite ore having the following average analysis:

| | |
|---|---|
| Sulfur | 52% |
| Iron | 45% |
| Arsenic | 1% |
| Copper | 0.3% |
| Lead | 0.5% |
| Zinc | 1.0% |
| Silver | 2 oz/ton |
| Gold | 0.05 oz/ton |

Exothermic reaction heat raises the contents of the vessel to 140° C. and this temperature is maintained for 1 hour. Vapor from this vessel is passed through a multi-plate still in which 2.5 tons of $AsCl_3$ are recovered.

The bulk of the liquid phase is then separated by means of a decantation vessel and the solids, containing some entrained sulfur and $S_2Cl_2$, are then treated with a stream of hot $Cl_2$ gas from the oxidizer. $FeCl_3$ and $S_2Cl_2$ are vaporized. The $FeCl_3$ is condensed at below 300° C. and passed into an oxidizer where it reacts with 19 tons of oxygen to produce 64 tons of $Fe_2O_3$ which is recovered. $S_2Cl_2$ is condensed below 138° C. and excess chlorine is absorbed by contact with a sulfur — $S_2Cl_2$ mixture. The nonvolatile solids consist of $ZnCl_2$, $PbCl_2$, $CuCl_2$ and $AgCl$.

The liquid product from the chlorinator is allowed to cool to about 30° C. in a crystallizer whereby 52 tons of rhombic sulfur are crystallized and removed. The remaining liquid is treated with 3.1 tons of makeup chlorine and added to the condensed $S_2Cl_2$ from the volatilization step to regenerate 840 tons of the starting solution.

We claim:

1. A process of decomposing iron sulfide which comprises chlorinating finely ground iron sulfide with a stoichiometric excess of liquid sulfur chloride ($S_2Cl_2$) of up to 20 moles of $S_2Cl_2$ per mole of iron sulfide at a temperature ranging from room temperature to about 150° C., said temperature being attained by exothermic reaction heat, thereby converting the iron sulfide into ferric chloride and elemental sulfur dissolved in excess liquid sulfur chloride, separating solids containing ferric chloride from the liquid, crystallizing sulfur from the remaining sulfur chloride liquid by cooling, oxidizing the ferric chloride to form iron oxide and chlorine, recovering the iron oxide, regenerating the liquid sulfur chloride from the sulfur crystallization stage by contacting it with chlorine and recycling the regenerated liquid sulfur chloride to the chlorination stage.

2. A process according to claim 1 wherein 5 to 8 moles of sulfur chloride are present per mole of iron sulfide during chlorination.

3. A process according to claim 2 wherein the chlorination is conducted at a temperature of about 135° to 150° C.

4. A process according to claim 1 wherein the starting sulfur chloride is saturated with elemental sulfur at room temperature.

5. A process according to claim 1 wherein the iron sulfide is pyrite ore.

6. A process according to claim 5 wherein the ore is ground to −200 mesh.

7. A process according to claim 1 wherein the solid chlorination products are separated from the liquid by filtration.

8. A process according to claim 7 wherein the separation includes at least one washing step.

9. A process according to claim 7 wherein the separation includes a distillation.

10. A process according to claim 7 wherein the chlorination products are contacted with a hot gas stream from the oxidation stage containing chlorine and ferric chloride, thereby vaporizing the ferric chloride and sulfur chloride in the reaction product while completely chlorinating any residual sulfides and entrained sulfur.

11. A process according to claim 10 wherein nonferrous metal chlorides are separated as solids from sulfur chloride and ferric chloride.

12. A process according to claim 1 wherein only as much sulfur is crystallized out of the sulfur chloride solution as originates from the ore.

13. A process according to claim 1 wherein the oxidation is conducted with substantially pure oxygen.

14. A process according to claim 13 wherein the chlorine gas coming from the oxidizer contains gaseous metal chlorides which condense out on cooling.

15. A process according to claim 1 wherein the regenerated liquid sulfur chloride being recycled to the chlorination stage is saturated with elemental sulfur at a temperature of at least room temperature.

* * * * *